US006501526B1

(12) United States Patent
Oh

(10) Patent No.: US 6,501,526 B1

(45) Date of Patent: Dec. 31, 2002

(54) FLAT PANEL DISPLAY APPARATUS HAVING HIGH ASPECT RATIO SPACERS AND METHOD FOR MANUFACTURING THE SAME

(75) Inventor: Jae Yeol Oh, Kyeongki-Do (KR)

(73) Assignee: Institute for Advanced Engineering, Seoul (KR)

(*) Notice: Subject to any disclaimer, the term of this patent is extended or adjusted under 35 U.S.C. 154(b) by 0 days.

(21) Appl. No.: 09/356,378

(22) Filed: Jul. 19, 1999

(51) Int. Cl.[7] .......................... G02F 1/1339; G02F 1/13

(52) U.S. Cl. ........................ 349/155; 349/156; 349/187

(58) Field of Search ................................ 349/155, 156, 349/187; 445/24, 25

(56) References Cited

U.S. PATENT DOCUMENTS

| | | | | | |
|---|---|---|---|---|---|
| 5,562,517 | A | * | 10/1996 | Taylor et al. | 445/25 |
| 5,708,325 | A | * | 1/1998 | Anderson et al. | 313/495 |
| 5,959,710 | A | * | 9/1999 | Yaniv | 349/155 |
| 6,124,918 | A | * | 9/2000 | Park et al. | 349/155 |
| 6,312,302 | B1 | * | 11/2001 | Na | 445/24 |
| 6,354,898 | B2 | * | 3/2002 | Kim | 445/24 |
| 6,366,009 | B1 | * | 4/2002 | Smith et al. | 313/292 |
| 6,416,375 | B1 | * | 7/2002 | Cho et al. | 445/25 |

* cited by examiner

*Primary Examiner*—Toan Ton
*Assistant Examiner*—Mike Qi
(74) *Attorney, Agent, or Firm*—Jacobson Holman PLLC

(57) ABSTRACT

A flat panel display apparatus having high aspect ratio spacers and a method for the apparatus are disclosed. The apparatus has an emitter panel having a lower substrate, cathode electrodes and gate electrodes; a display panel having an upper substrate, transparent anode electrodes and fluorescent materials; a plurality of spacers having supporting walls having high aspect ratio and supporting legs respectively protruded from the supporting walls; and a sealing member for vacuum sealing peripheral regions of the emitter panel and the display panel. Therefore, the spacers are easy to be separately fixed in the display panel due to the supporting legs and vacuumizing of a space between the emitter panel and the display panel can be easily accomplished because the supporting walls and the supporting legs respectively have different heights.

18 Claims, 12 Drawing Sheets

80

80

FLAT PANEL DISPLAY APPARATUS HAVING HIGH ASPECT RATIO SPACERS AND METHOD FOR MANUFACTURING THE SAME

BACKGROUND OF THE INVENTION

1. Field of the Invention

The present invention relates to a flat panel display apparatus and a method for manufacturing the same, and more particularly to a field emission display (FED) apparatus including high aspect ratio spacers which have improved structures for maintaining a gap between an upper substrate and a lower substrate and to a method for manufacturing the same.

2. Description of the Prior Art

As the recent trend in the field of display apparatus is to make a large-sized display apparatus with a high definition, the main emphasis of the research and development has been turned from a cathode ray tube (CRT) to new flat panel display devices such as a liquid crystal display (LCD), an electroluminescent display (ELD), a plasma display panel (PDP) or a vacuum fluorescent display (VFD). The new flat panel display devices have many advantages and disadvantages in comparison with the CRT.

However, the FED, one of the new flat panel display devices, has been anticipated to resolve most of all the disadvantages of the above devices. The FED has such advantages as a simple structure of electrodes therein, a reduced power consumption, a high operation speed, a capability of a multiplexed addressing, a high definition, a wide viewing angle and a perfect color expression. Also, the FED can have a big size display panel since it adopts inner supporters.

The FED generally comprises a lower substrate on which cathode electrodes with emitter tips and gate electrodes are formed, an upper substrate on which anode electrodes and fluorescent materials are formed, and spacers formed between both substrates. The spacers maintain the space between the upper substrate and the lower substrate and the space has the highly vacuumed condition. As an intense electric field is developed among the cathode, the gate and the anode electrodes when the space is maintained in the high vacuum condition, electrons are emitted from the emitter tips by an electric field emission and a tunneling effect.

In the conventional FED, the spacer is generally formed according as a sealant is accumulated to a predetermined height and then sintered by a screen printing technique. Also, the spacer is formed by arranging pre-manufactured glass balls by a predetermined interval, by growing optical fiber between both substrates or by standing bar-shaped glass or ceramic material between the two substrates. Furthermore, the spacer is formed by a plating method using a photoresist pattern or the spacer is mounted by inserting into a groove formed on the upper substrate or on the lower substrate.

The screen printing technique is limited because the width of the spacer becomes substantially wide when the spacer has a height of above 200 μm. When the spacer is made of the glass ball, the spacer has a low aspect ratio of about 1 due to the low aspect ratio of the glass ball with reference to U.S. Pat. No. 5,562,517.

In the method using the optical fiber, it is difficult to cut and fix the fiber for forming the spacer. The manufacturing process is very complicated in the plating method.

In the method that the spacer having a bar shape or a "T" shape is inserted into the groove as disclosed in U.S. Pat. Nos., 5,578,325 and 5,708,325, it is difficult to form the groove on the upper substrate or the lower substrate where the spacer is inserted. Further, it is more difficult to expose the electrodes and to coat the fluorescent material on the electrodes. When the spacer is made of the bar-shaped glass, the spacer may be bent during the sintering process or the emitter tip may be damaged by the falling of the spacer.

In general, the spacer of the FED preferably has not only a sufficient strength for maintaining the space between both substrates against an external pressure (that is, the atmospheric pressure) but also a minimized area for maximizing the active region of the FED. If the width of the spacer increases to maintain the space against the external pressure, the active region decreases due to the increased area of the spacer. However, the strength of the spacer is lowered if the width of the spacer decreases. In particular, the spacer should have a height of about 1,000 μm when the fluorescent materials for a high voltage are coated on the electrodes so that the aspect ratio of the spacer (that is, the ratio of height over width) must be more than 10.

SUMMARY OF THE INVENTION

Considering the above-mentioned problems, it is a first object of the present invention to provide a flat panel display apparatus comprising high aspect ratio spacers having supporting walls and supporting legs which are integrally formed by exposing and etching processes and by using a photosensitive material.

It is a second object of the present invention to provide a method for manufacturing a flat panel display apparatus comprising high aspect ratio spacers having supporting walls and supporting legs integrally formed by exposing and etching processes and by using a photosensitive material.

It is a third object of the present invention to provide a flat panel display apparatus comprising a latticed spacer having supporting posts and connecting walls whose heights are lower than those of the supporting posts thereby accomplishing smooth evacuation of a space between an emitter panel and a display panel.

It is a forth object of the present invention to provide a method for manufacturing a flat panel display apparatus comprising a latticed spacer having supporting posts and connecting walls whose heights are lower than those of the supporting posts thereby accomplishing smooth evacuation of a space between an emitter panel and a display panel.

To accomplish the first object of the present invention, a flat panel display apparatus comprises an emitter panel, a display panel, a plurality of spacers and a sealing member. The emitter panel has a lower substrate, cathode electrodes formed on the lower substrate and gate electrodes formed on the cathode electrodes. The display panel has an upper substrate, transparent anode electrodes formed on the upper substrate and fluorescent materials coated on the anode electrodes. The spacers maintains the emitter panel and the display panel by a predetermined gap. The spacers comprises supporting walls having high aspect ratio and supporting legs respectively protruded from the supporting walls.

Preferably, the supporting legs protruded from the supporting walls in a first perpendicular direction and in a second perpendicular direction in order to support the supporting walls. The sealing member keeps vacuum sealing peripheral regions of the emitter panel and the display panel.

The spacers are formed by exposing and etching a photosensitive material. The cross sections of the supporting walls have rectangular shapes, hexagonal shapes or trapezoid shapes and the cross sections of the supporting legs have triangular shapes by a tilt exposure method or rectangular shapes by a vertical exposure method. If the cross sections of the supporting walls have the trapezoid shapes, the upper ends of the supporting walls are attached to the display panel. The heights of the supporting legs are lower than heights of the supporting walls.

According to one embodiment of the present invention, the lengths of the supporting walls are longer than a display region of the display panel and the supporting legs are formed at both lateral portions of the supporting walls which lie at the peripheral region of the display panel so that the spacers have bar shapes which are longer than the display region of the display panel.

According to another embodiment of the present invention, the lengths of the supporting walls are shorter than the display region of the display panel and the supporting legs are formed at lateral portions of the supporting walls which lie at the peripheral region of the display panel so that the spacers have half bar shapes which are shorter than the display region of the display panel.

According to other embodiment of the present invention, the lengths of the supporting walls are shorter than the display region of the display panel and a plurality of supporting legs are formed at lateral portions of the supporting walls by predetermined intervals so that the spacers have rib shapes.

Preferably, the flat panel apparatus further comprises a plurality of fixing jigs having recesses for receiving lateral portions of the supporting walls where the supporting legs are formed in order to fix the spacers. The jigs are formed at the peripheral region of the display panel.

To accomplish the second object, a method for manufacturing a flat panel display apparatus comprising the steps of:

providing an emitter panel having a lower substrate, cathode electrodes formed on the lower substrate and gate electrodes formed on the cathode electrodes;

providing a display panel having an upper substrate, transparent anode electrodes formed on the upper substrate and fluorescent materials coated on the anode electrodes;

exposing and etching a photosensitive material to form a plurality of spacers comprising supporting walls having high aspect ratio and supporting legs respectively protruded from the supporting walls in order to support the supporting walls;

arranging the spacers between the emitter panel and the display panel by a predetermined interval for maintaining the emitter panel and the display panel by a predetermined gap; and sealing peripheral regions of the emitter panel and the display panel and evacuating a space between the emitter panel and the display panel.

Preferably, the step of exposing and etching the photosensitive material to form a plurality of spacers further comprises the substeps of:

providing the photosensitive material having a predetermined thickness;

placing an exposing mask above the photosensitive material, wherein the exposing mask includes a pattern having a supporting line having a predetermined length and subsidiary lines protruded from the supporting line and the subsidiary lines have lengths shorter than a length of the supporting line;

exposing the photosensitive material by using the exposing mask;

heat-treating the exposed photosensitive material; and etching an exposed portion of the photosensitive material to form the supporting walls formed according to the supporting line and the supporting leg formed according the subsidiary lines, wherein the supporting walls and the supporting legs are simultaneously formed.

More preferably, the substep of exposing the photosensitive material is performed by a tilt exposure method according to the following equation:

$$\theta<\tan(w/2H)$$

wherein θ, w and h respectively represent a tilt angle of the tilt exposure method, widths of the subsidiary lines and a thickness of the photosensitive material.

Also, the substep of exposing the photosensitive material is performed by a tilt exposure method according to the following equation:

$$\theta>\tan(w/2h)$$

wherein θ, w and h respectively represent a tilt angle of the tilt exposure method, widths of the subsidiary lines and a thickness of the photosensitive material.

Furthermore, the substep of exposing the photosensitive material is performed by a tilt exposure method according the following equations:

$$\theta_1<\tan(w/2h) \text{ and } \theta_2>\tan(w/2h)$$

wherein $\theta_1$ represents left and right tilt angles of the supporting line, w means width of the subsidiary lines, h represents a thickness of the photosensitive material and $\theta_2$ represents left and right tilt angles of the subsidiary lines.

The substep of exposing the photosensitive material further comprises:

placing the exposing mask under the photosensitive material corresponding the step of placing the exposing mask above the photosensitive material; and exposing the photosensitive material by using the exposing mask and by a tilt exposure method according to the following equation:

$$\theta_1<\tan(w/2h)$$

wherein $\theta_1$, w and h respectively represent the left and right tilt angles of the supporting line, the widths of the subsidiary lines and the thickness of the photosensitive material.

The photosensitive material is composed silicon oxide ($SiO_2$), lithium oxide ($Li_2O$), aluminum oxide ($Al_2O_3$), sodium oxide ($Na_2O$), silver oxide ($Ag_2O$) and cerium oxide ($CeO_2$), and the photosensitive material has a thickness of between about 0.2 mm and about 2.0 mm.

The step of providing the display panel further comprises:

forming a plurality of fixing jigs having recesses at the peripheral region of the display panel; and forming at least one alignment mark for aligning the display panel and the emitter panel at the peripheral region of the display panel, wherein the fixing jigs and the alignment mark are simultaneously formed and the spacers are fixed by inserting lateral portions of the spacers into the recesses of the jigs.

To accomplish the third object, a flat panel display apparatus comprises an emitter panel having a lower substrate, cathode electrodes formed on the lower substrate and gate electrodes formed on the cathode electrodes, a display panel having an upper substrate, transparent anode electrodes formed on the upper substrate and fluorescent materials coated on the anode electrodes, a latticed spacer comprising a plurality of supporting posts having high aspect ratio and a plurality of connecting walls, wherein the supporting posts are respectively formed at lattice points in a display portion of the display panel, the connecting wall are respectively formed between the supporting posts, and a sealing means for vacuum sealing peripheral regions of the emitter panel and the display panel.

The latticed spacer is formed by a tilt exposing and etching a photosensitive material and heights of the connecting walls are lower than heights of the supporting posts.

Finally, to accomplish the forth object, a method for manufacturing a flat panel display apparatus comprising the steps of:

- providing an emitter panel having a lower substrate, cathode electrodes formed on the lower substrate and gate electrodes formed on the cathode electrodes;
- providing a display panel having a transparent upper substrate, transparent anode electrodes formed on the upper substrate and fluorescent materials coated on the anode electrodes;
- exposing and etching a photosensitive material to form a latticed spacer comprising a plurality of supporting posts having high aspect ratio and a plurality of connecting walls, wherein the supporting posts are respectively formed at lattice points in a display portion of the display panel and the connecting walls are respectively formed between the supporting posts;
- fixing the latticed spacer between the emitter panel and the display panel for maintaining the emitter panel and the display panel by a predetermined gap; and
- sealing peripheral portions of the emitter panel and the display panel and evacuating a space between the emitter panel and the display panel to vacuumize the space.

Preferably, the step of exposing and etching the photosensitive material to form the latticed spacer further comprises the substeps of:

- providing the photosensitive material having a predetermined thickness;
- placing an exposing mask having a latticed pattern above the photosensitive material;
- exposing a top and a bottom of the photosensitive material in a first direction and in a second direction by using the exposing mask;
- heat-treating the exposed photosensitive material; and
- etching an exposed portion of the photosensitive material in order to form the supporting posts having high aspect ratio and the connecting walls having heights lower than the heights of the supporting posts.

The substep of exposing the photosensitive material is performed by a tilt exposure method according to the following equation:

$$\tan(w/2h)<\theta<\tan(w/h)$$

wherein θ, w and h respectively represent a tilt angle of the tilt exposure method, a width of the latticed pattern and a thickness of the photosensitive glass.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE DRAWINGS

Hereinafter, preferred embodiments of the present invention will be explained in more detail with reference to the accompanying drawings.

Figure 1:
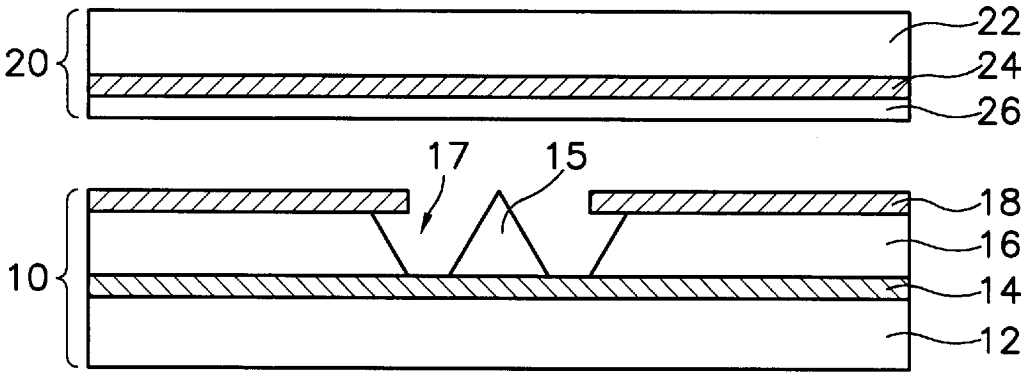
FIG. 1 is a cross-sectional view for showing a FED apparatus according to the present invention.

FIG. 1 is a cross-sectional view for showing a FED apparatus according to the present invention. Reference numeral 10 represents an emitter panel or an emitting panel and reference numeral 20 indicates an anode panel or a display panel in FIG. 1. electrode 14, an insulating layer 16 and a gate electrode 18. Cathode electrode 14 is formed on lower glass substrate 12 and insulating layer 16 is formed on cathode electrode 14. A reverse cone-shaped hole 17 is formed in insulating layer 16 so that a portion of cathode electrode 14 is exposed through hole 17. An emitter tip 15 is located at the exposed portion of cathode electrode 14. Gate electrode 18 is formed on insulating layer 16. Emitter tip 15 is a micro tip and preferably, has a cone shape or a wedge shape.

Display panel 20 has a transparent upper glass substrate 22, an anode electrode 24 and a fluorescent material 26. Anode electrode 24 is formed on upper substrate 22 and fluorescent material 26 is formed on anode electrode 24. Transparent upper glass substrate 22 is arranged to face with lower glass substrate 12. Anode electrode 24 is made of a transparent conductive material such as indiumtin oxide (ITO).

A predetermined gap should be interposed between emitter panel 10 and display panel 20. A space between emitter panel 10 and display panel 20 is maintained in a high vacuum condition, for example, about $10^{-7}$ torr. When high voltage is applied to cathode electrode 14 and anode electrode 24, a high electric field is generated between emitter tip 15 and anode electrode 24. Hence, electrons are emitted from the surface of emitter tip 15 into the space between emitter panel 10 and display panel 20 by the electric field according to the tunneling effect. The emitted electrons collide with fluorescent material 26 formed on anode electrode 24 at high speed so that visible rays are generated from fluorescent material 26 due to the collision energy of the electrons.

Atmospheric pressure is applied to upper substrate 22 and lower substrate 12 because the space between emitter panel 10 and display panel 20 should be maintained in high vacuum state. Therefore, spacers should be formed between upper substrate 22 and lower substrate 12 in order to overcome the deformation stress due to the disparity between the substrate 12 in order to overcome the deformation stress due to the disparity between the atmospheric pressure and the pressure of the space. When a voltage is applied, especially, a high voltage is applied to cathode electrode 14 and anode electrode 24, the spacers preferably have heights of above 1 mm (1,000 $\mu$m) and the aspect ratio (that is, the ratio of height over width) of above 10. Considering such a problem, the spacers of the present invention are made of photosensitive material such as a photosensitive glass or a photosensitive ceramic each of which has a thickness of about 1 mm.

Figure 2A:
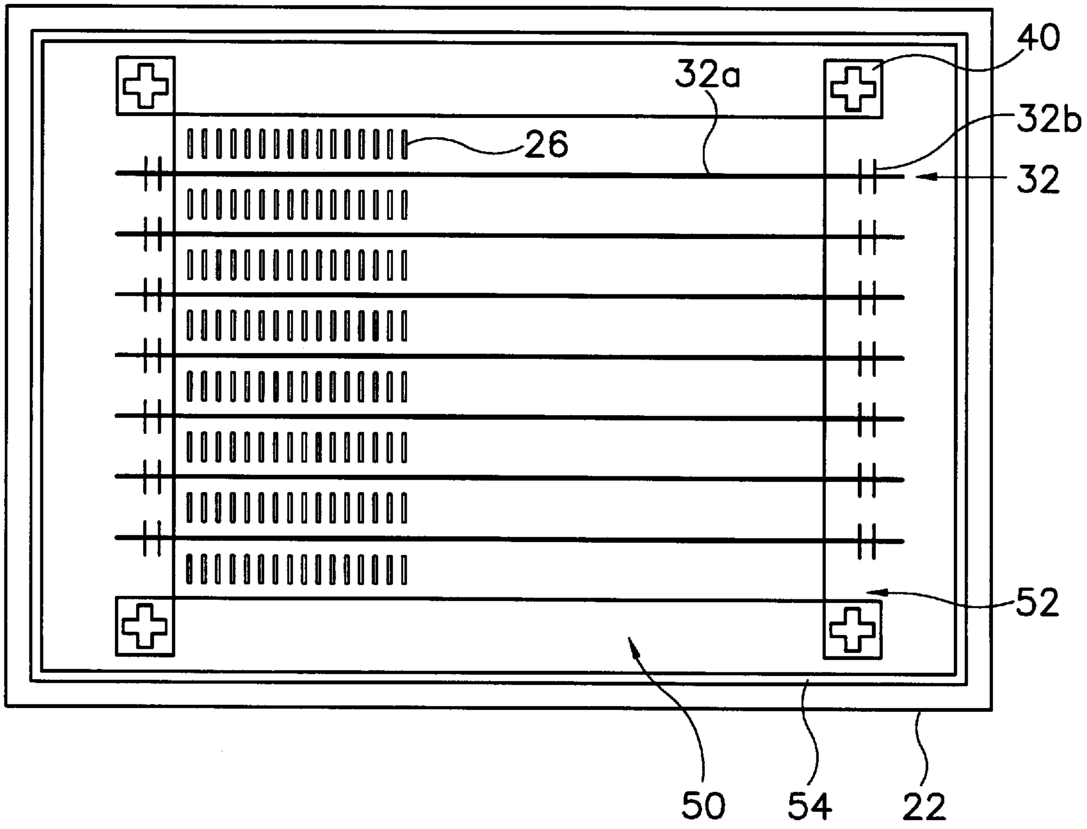
FIG. 2A is a plan view for illustrating a field emission display apparatus having full bar-shaped spacers according to one embodiment of the present invention.
Figure 2B:
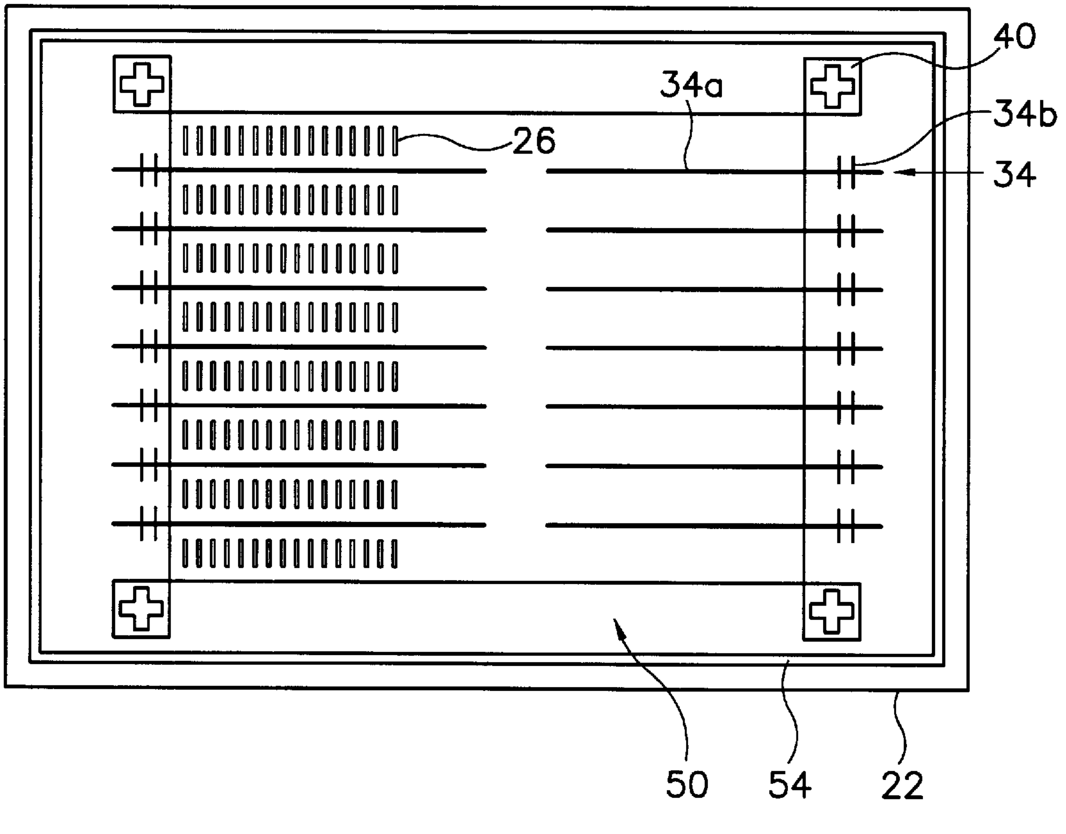
FIG. 2B is a plan view for illustrating a field emission display apparatus having half bar-shaped spacers according to another embodiment of the present invention.
Figure 2C:
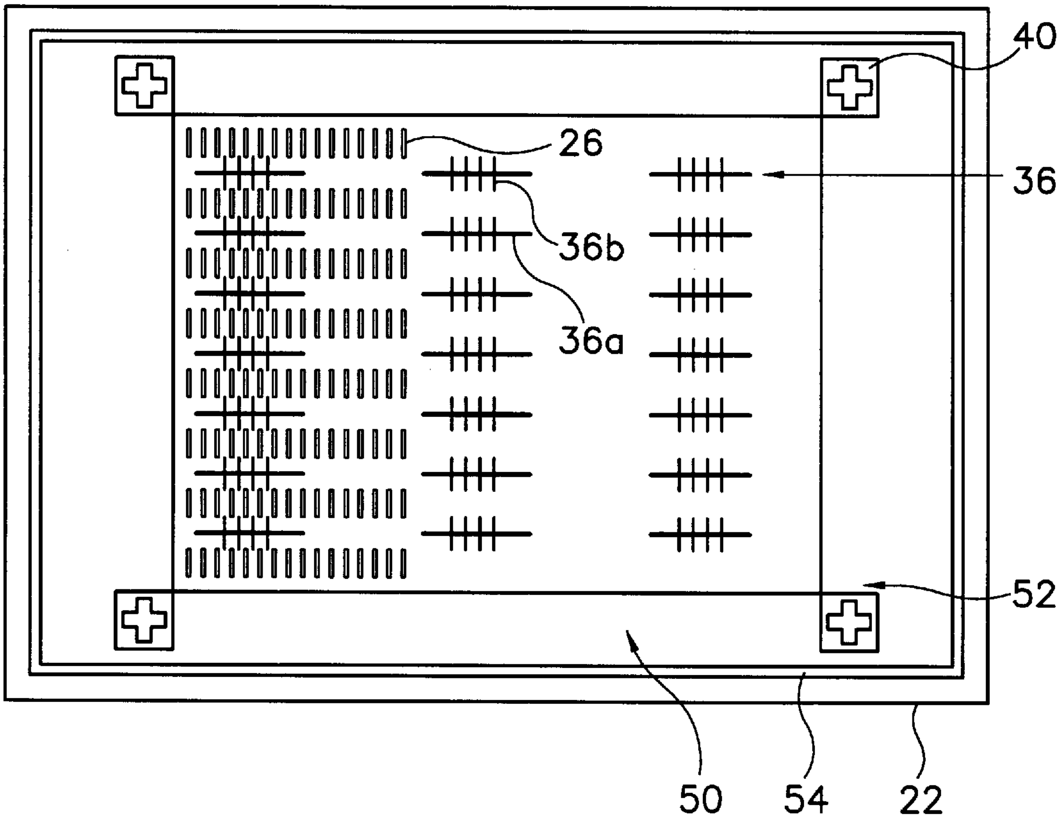
FIG. 2C is a plan view for illustrating a field emission display apparatus having rib-shaped spacers according to other embodiment of the present invention.

FIG. 2A is a plan view for illustrating a field emission display apparatus having full bar-shaped spacers according to one embodiment of the present invention, FIG. 2B is a plan view for illustrating a field emission display apparatus having half bar-shaped spacers according to another embodiment of the present invention and FIG. 2C is a plan view for illustrating a field emission display apparatus having rib-shaped spacers according to other embodiment of the present invention.

Referring to FIGS. 2A to 2C, spacers 32, 34 and 36 respectively have supporting walls 32*a*, 34*a* and 36*a* and supporting legs 32*b*, 34*b* and 36*b*. Supporting walls 32*a*, 34*a* and 36*a* are prolonged in the horizontal direction and supporting legs 32*b*, 34*b* and 36*b* are protruded to the left and to the right from portions of supporting walls 32*a*, 34*a* and 36*a*, respectively, in the perpendicular direction.

Fluorescent material 26 of display panel 20 is separated according to each pixel and is arranged in a display region 50 (that is, an active region of display panel 20), so fluorescent material 26 is arranged as a matrix type. Spacers 32, 34 and 36 are located among the pixels in display region 50 such that spacers 32, 34 and 36 are not overlapped with fluorescent material 26 in display region 50 as shown in FIGS. 2A to 2C. Supporting legs 32*b* and 34*b* are formed at both lateral portions of bar-shaped spacers 32 and 34. Both lateral portions of bar-shaped spacers 32 and 34 are located in peripheral region 52 enclosing display region 50 and a sealing member 54. Bar-shaped spacers 32 and 34 are arranged in display region 50 by a predetermined pitch, for example, several tens millimeters. Bar-shaped spacers 32 and 34 can easily stood by means of supporting legs 32*b* and 34*b* in peripheral region 52 without falling down. An adhesive agent, for example, a sealant is coated beneath supporting legs 32*b* and 34*b* in order to fix supporting legs 32*b* and 34*b*, so bar-shaped spacers 32 and 34 are fixed in display region 50 by supporting legs 32*b* and 34*b*.

The length of full bar-shaped spacer 32 is much longer than the width of full bar-shaped spacer 32 since both lateral portions of full bar-shaped spacer 32 are prolonged to peripheral region 52 across display region 50. For example, full bar-shaped spacer 32 has a length of above 5cm and a width of several tens micrometers. A portion of full bar-shaped spacer 32 may be bent in display region 50 because of its long length. Therefore, half bar-shaped spacer 34 may be preferable so as to avoid such problem of bending because half bar-shaped spacer 34 has half a length of full bar-shaped spacer 32. Also, half bar-shaped spacer 32 can be arranged either alternately or in the same line.

Rib-shaped spacer 36 is arranged by a predetermined interval among the pixels in display region 50. Rib-shaped spacer 36 has a plurality of supporting legs 36*b* perpendicularly protruded from the whole lateral portion of supporting wall 36*a*. In comparison with bar-shaped spacers 32 and 34, supporting legs 36*b* of rib-shaped spacer 36 are shorter than bar-shaped spacers 32 and 34. Preferably, the intervals of supporting legs 36*b* of rib-shaped spacer 36 has the same intervals of pixels, so the plurality of supporting legs 36*b* are respectively located among the pixels.

Full bar-shaped spacer 32 or half bar-shaped spacer 34 or rib-shaped spacer 36 is separately adopted as spacers located between emitter panel 10 and display panel 20. Also, the combination of full bar-shaped spacer 32, half bar-shaped spacer 34 and rib-shaped spacer 36 can be used. In this case, it is important that a certain region isolated by the spacers may not be generated in display region 50 when the space between emitter panel 10 and display panel 20 is vacuumized. If the isolated region is generated in display region 50, the evacuation of the apparatus may not be completed.

Marks for arranging or an alignment key 40 is used in the fabrication of emitter panel and display panel 20 when emitter panel 10 and display panel 20 respectively have thicknesses of above 1 mm.

Figure 2D:
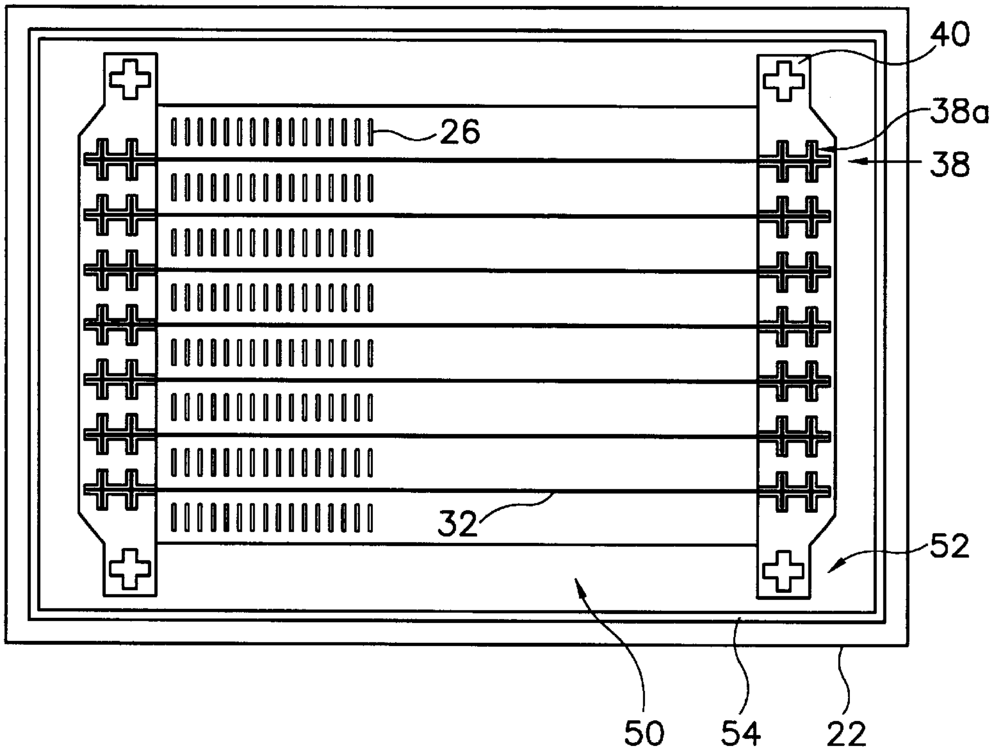
FIG. 2D is a plan view for illustrating a field emission display apparatus having full bar-shaped spacers and fixing jigs according to an embodiment of the present invention.
Figure 2E:
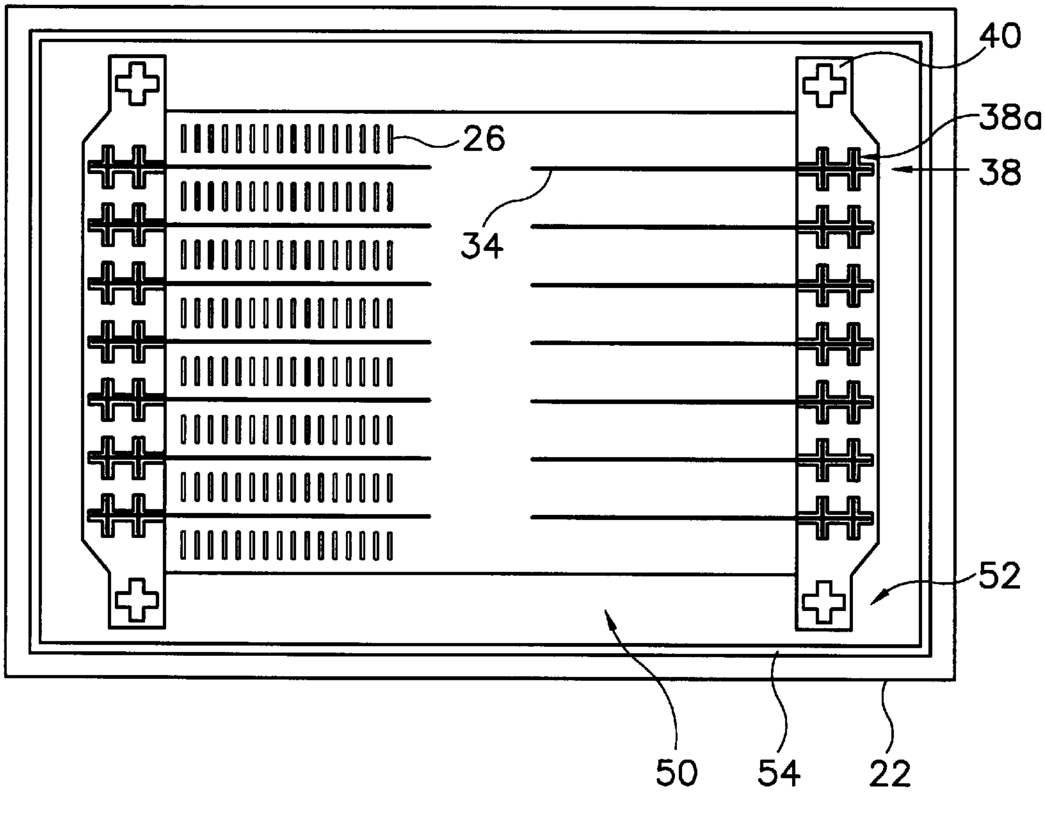
FIG. 2E is a plan view for illustrating a field emission display apparatus having half bar-shaped spacers and fixing jigs according to another embodiment of the present invention.

FIG. 2D is a plan view for illustrating a field emission display apparatus having full bar-shaped spacers and fixing jigs according to an embodiment of the present invention and FIG. 2E is a plan view for illustrating a field emission display apparatus having half bar-shaped spacers and fixing jigs according to another embodiment of the present invention.

To fixing bar-shaped spacers 32 and 34 on emitter panel 10 or beneath display panel 20, fixing jig 38 is preferable as shown in FIGS. 2D and 2E. Fixing jig 38 is mounted at peripheral region 52 of the display portion 50 and has a recess 38*a* which receives lateral portions of bar-shaped spacer 32 and 34. That is, lateral portions of bar-shaped spacers 32 and 34 are inserted into recess 38*a* so as to fix bar-shaped spacers 32 and 34. Preferably, fixing jig 38 has a plurality of recesses 38*a*. Bar-shaped spacers 32 and 34 are fixed by using a sealant after lateral portions of bar-shaped spacers 32 and 34 are inserted into recesses 38. Also preferably, alignment mark 40 and fixing jig 38 are simultaneously formed by photolithography process and by using an insulator or a photosensitive glass.

Figure 3:
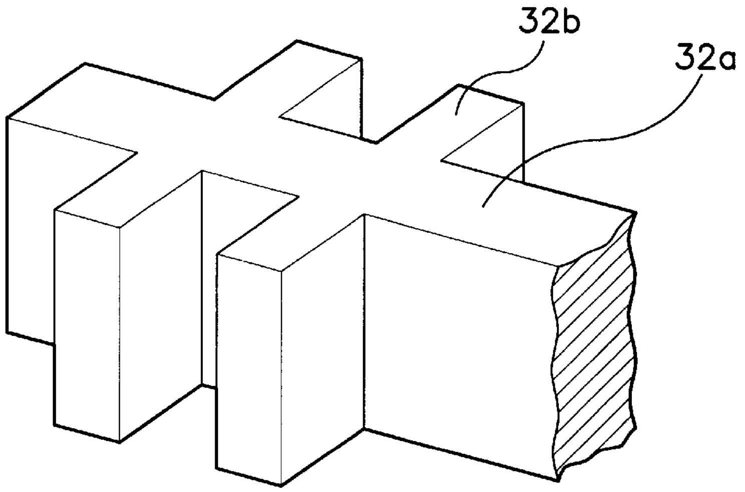
FIG. 3 is a partially cutaway view in perspective of a bar-shaped spacer according to a first embodiment of the present invention.
Figure 4:
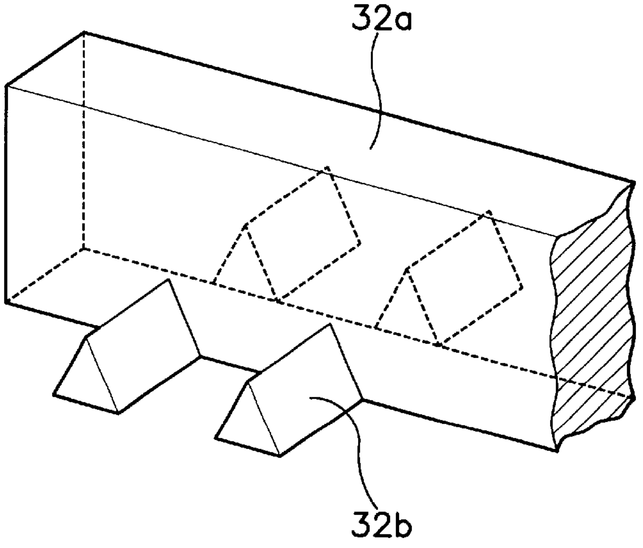
FIG. 4 is a partially cutaway view in perspective of a bar-shaped spacer according to a second embodiment of the present invention.

In the present invention, the cross sections of bar-shaped spacer 32 and 34 can have various shapes such as triangles, tetragons, trapezoids or hexagons as shown in FIGS. 3 to 6. FIG. 3 is a partially cutaway view in perspective of a bar-shaped spacer according to a first embodiment of the present invention and FIG. 4 is a partially cutaway view in perspective of a bar-shaped spacer according to a second embodiment of the present invention.

Referring to FIG. 3, spacer 32 has supporting wall 32*a* and supporting legs 32*b* which respectively have tetragonal cross sections. Hence, supporting wall 32*a* and supporting leg 32*b* have the same heights.

Referring to FIG. 4, spacer 32 has supporting leg 32*b* having a triangular cross section while supporting wall 32*a* has a tetragonal cross section. According to the second embodiment, spacer 32 is manufactured by a method as shown in FIG. 7.

Figure 7:
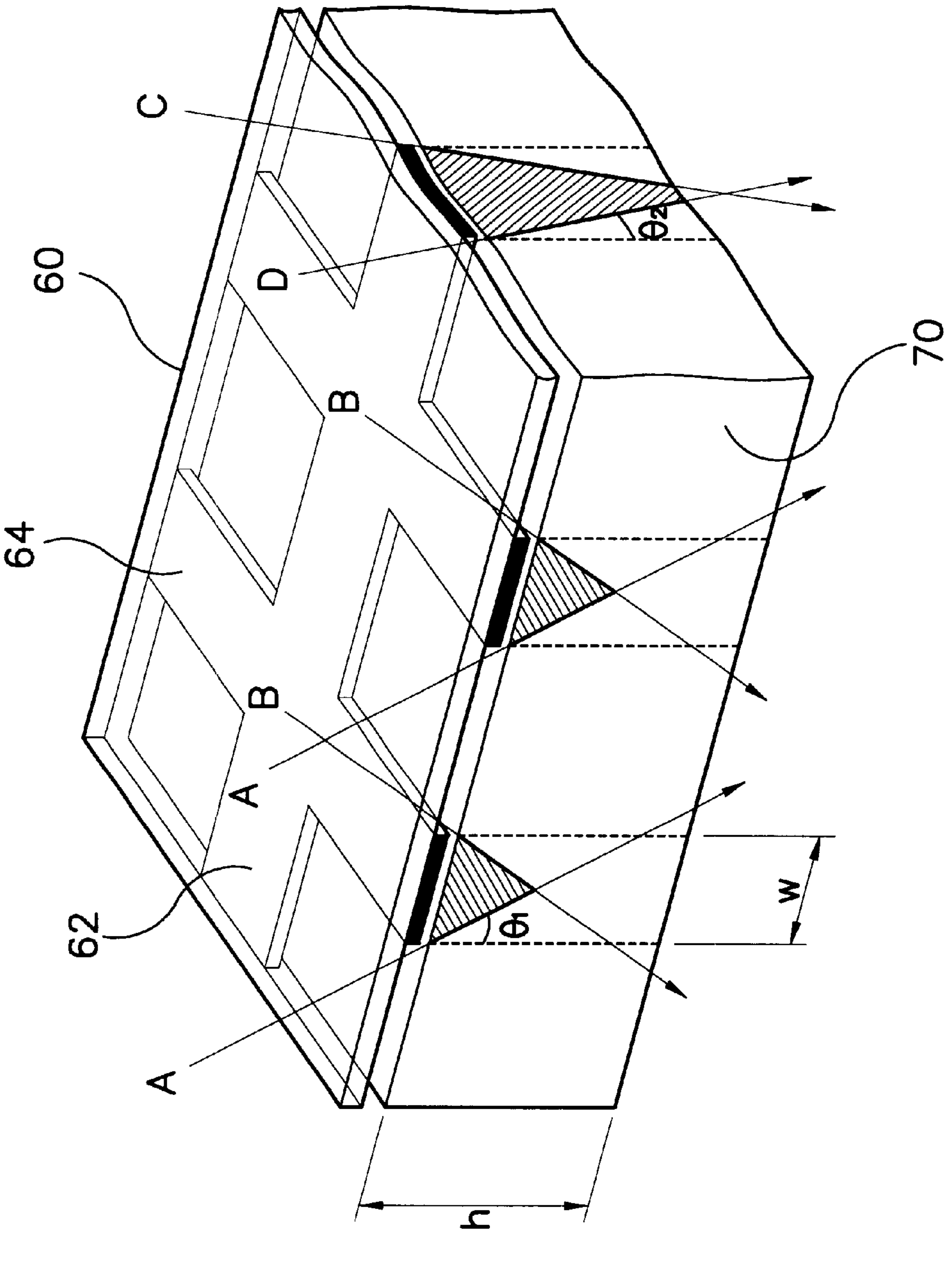
FIG. 7 is a perspective view for illustrating a tilt exposure process to form a bar-shaped spacer according to an embodiment of the present invention.

Referring to FIG. 7, a photosensitive material, for example photosensitive glass 70, is exposed by using an exposure mask 60 having a mask pattern. The mask pattern has a supporting line 62 and subsidiary lines 64. Photosensitive glass 70 is exposed by a tilt exposure method having a tilt angle of θ according to following equation (1):

$$\theta > \tan(w/2h) \quad (1)$$

wherein w is widths of subsidiary lines 64 and h means a thickness of photosensitive glass 70.

When photosensitive glass 70 is exposed in the right direction A and in the left direction B centering around subsidiary lines 64 by the tilt exposure method with the angle of θ, portions of photosensitive glass 70 is divided into an exposed portion and an unexposed portion. Namely, a first portion of the unexposed portion under subsidiary lines 64 has a triangular cross section, which will be supporting leg 32*b* and a second portion of the unexposed portion under supporting line 62 has a rectangular cross section, which will be supporting wall 32*a*. Thus, the height of supporting leg 32*b* is lower than that of supporting wall 32*a*.

Figure 5:
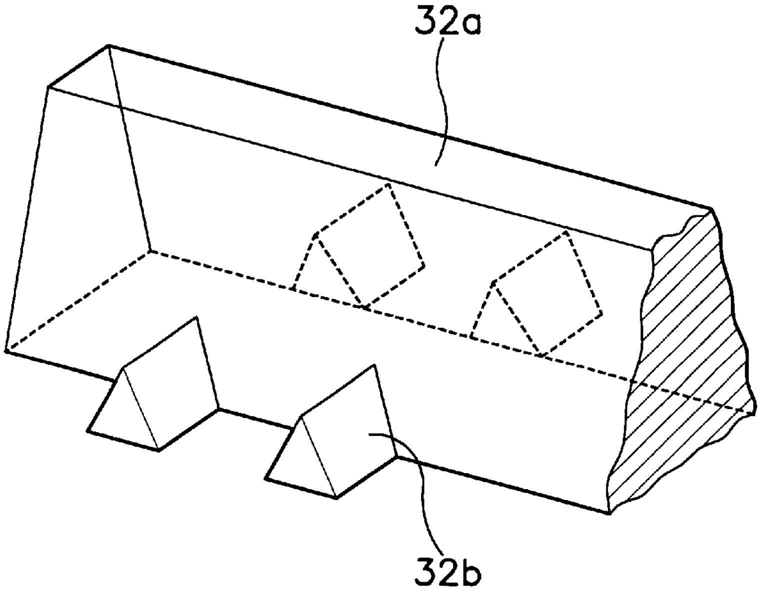
FIG. 5 is a partially cutaway view in perspective of a bar-shaped spacer according to a third embodiment of the present invention.

FIG. 5 is a partially cutaway view in perspective of a bar-shaped spacer according to a third embodiment of the present invention.

Referring to FIGS. 5 and 7, photosensitive glass 70 is exposed by using an exposure mask 60 having a mask pattern including a supporting line 62 and subsidiary lines 64. Photosensitive glass 70 is exposed by the tilt exposure method having tilt angles of $\theta_1$ and $\theta_2$ according to following equations (2) and (3):

$$\theta_1 > \tan(w/2h) \quad (2)$$

$$\theta_2 < \tan(w/2h) \quad (3)$$

wherein w is the width of subsidiary lines 64 and h means the thickness of photosensitive glass 70.

When photosensitive glass 70 is exposed in the right direction A and in the left direction B centering around subsidiary lines 64 by a first tilt exposure step with the angle of $\theta_1$, and then photosensitive glass 70 is exposed in the downward direction C and in the upward direction D centering around supporting line 62 by a second tilt exposure step with the angle of $\theta_2$, portions of photosensitive glass 70 is divided into an exposed portion and an unexposed portion so that a first portion of the unexposed portion under subsidiary line 64 has a triangular cross section, which will be supporting leg 32*b* and a second portion of the unexposed portion under supporting line 62 has a trapezoid cross section, which will be supporting wall 32*a*. When supporting wall 32*a* has the trapezoid, it is preferable that an upper end of supporting wall 32*a* is attached to display panel 20 and a bottom of supporting wall 32*a* is fixed on emitting panel 10 in order to minimize the space of spacer 32 in display region 50.

Figure 6:
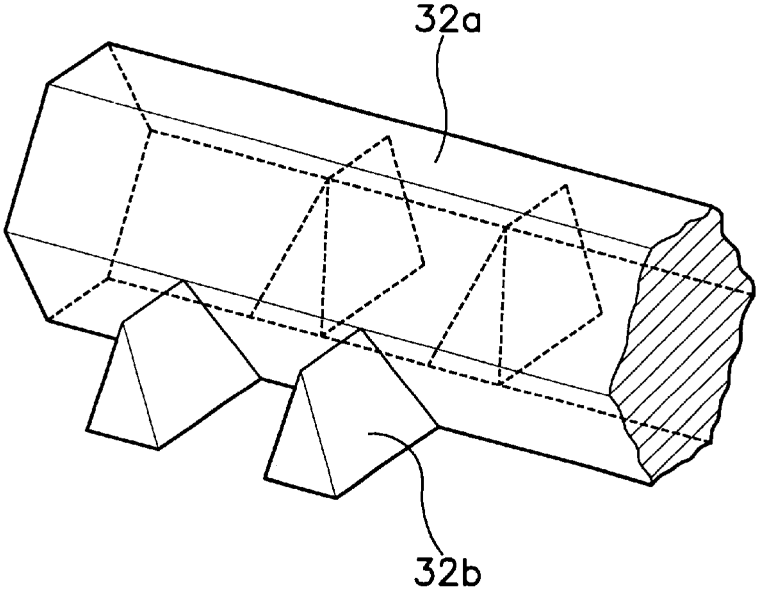
FIG. 6 is a partially cutaway view in perspective of a bar-shaped spacer according to a forth embodiment of the present invention.

FIG. 6 is a partially cutaway view in perspective of a bar-shaped spacer according to a forth embodiment of the present invention.

Referring to FIGS. 6 and 7, spacer 32 comprises supporting wall 32*a* having a hexagonal cross section and supporting leg 32*b* having a triangular cross section. Such spacer 32 is manufactured according to the following method.

Photosensitive glass 70 is exposed by using an exposure mask 60 having a mask pattern including a supporting line 62 and subsidiary lines 64 by the above-described tilt exposure method having tilt angles of θ, and $\theta_2$ according to equations (2) and (3). When photosensitive glass 70 is exposed in the right direction A and in the left direction B centering around subsidiary lines 64 by the first tilt exposure step with the angle of $\theta_1$, and then photosensitive glass 70 is exposed in the downward direction C and in the upward direction D centering around supporting lines 62 by the second tilt exposure step with the angle of $\theta_2$, so portions of photosensitive glass 70 is divided into an exposed portion and an unexposed portion so that a first portion of the unexposed portion under subsidiary lines 64 has a triangular cross section, which will be supporting leg 32*b* and a second portion of the unexposed portion under supporting line 62 has a trapezoid cross section, which will be supporting wall 32*a*. Subsequently, after exposure mask 60 is placed under the bottom of photosensitive glass 70, the first portion has a triangular cross section and the second portion has a hexagonal cross section by exposing from the bottom of photosensitive glass 70 according to the above-described tilt exposure steps.

The method for manufacturing the flat panel apparatus having the above spacers according to one embodiment of the present invention will be described as follows.

Referring to FIG. 1, at first, emitter panel 10 is provided after cathode electrodes 14 are formed on low glass substrate 12 and then emitter tip 15 and gate electrodes 18 are formed on the cathode electrodes 14. Emitter panel 10 includes low glass substrate 12, cathode electrode 14, emitter tip 15 and gate electrodes 18. Then, display panel 20 is provided. Display panel 20 includes transparent upper glass substrate 22, anode electrodes 24 formed on upper glass substrate 22 and fluorescent materials 26 coated on anode electrodes 24.

Subsequently, exposure mask 60 is manufactured after a metal, for example chrome (Cr), is coated on a quartz substrate (not shown) and is patterned as a full bar shape, a half bar shape or a rib shape. Hence, exposure mask 60 has the full bar shape, the half bar shape or the rib shape according to the metal pattern. Exposure mask 60 comprises a pattern which includes a pitch having a predetermined interval such as about 600 μm and a width of about 30 μm.

Then, photosensitive glass 70 having a thickness of between about 200 μm and about 2000 μm is provided. Preferably, photosensitive glass 70 has a thickness of about 1000 μm. Such photosensitive glass 70 is composed of silicon oxide ($SiO_2$) of 75–85% by weight, lithium oxide ($Li_2O$) of 7–11% by weight, aluminum oxide ($Al_2O_3$) of 3–6% by weight, sodium oxide ($Na_2O$) of 1–2% by weight, silver oxide ($Ag_2O$) of 0.05–0.15% by weight and cerium oxide ($CeO_2$) of 0.01–0.04% by weight.

Photosensitive glass 70 is exposed by using exposure mask 60 and by an ultra violet (U.V.) ray having a wavelength of about 312 nm. The exposure process is achieved by the above-described method according to the structure of the spacers. As shown in FIG. 7, the tilt or the vertical exposure is executed according to the desired spacers having the various cross sections. In the exposed portion of photosensitive glass 70, photochemical reactions occur as in following photochemical equations (a) and (b):

$$Ce^{3+} + U.V.\ \text{ray (312 nm)} \rightarrow Ce^{4+} + e^- \qquad (a)$$

$$Ag^+ e^- \rightarrow Ag \qquad (b)$$

After the exposure process is completed, exposed photosensitive glass 70 is primarily heat-treated in a furnace at a temperature of about 500° C. during about an hour, and then secondarily heat-treated at a temperature of about 600° C. when the temperature of the furnace gradually increases to 600° C. Continuously, the exposed portion of photosensitive glass 70 is etched by wet etching method and by using a hydrogen fluoride (HF) solution having a concentration of about 10%.

Photosensitive glass 70 is rinsed and dried after the etching process, so the cross sections of supporting walls, which correspond to supporting line 62 of the mask pattern, become tetragons, trapezoids or hexagons and the cross sections of the supporting legs, which correspond to subsidiary lines 64, become tetragonal shapes or triangular shapes as shown in FIGS. 3 to 6. Therefore, the bar-shaped spacers having the supporting walls and the supporting legs are obtained.

Subsequently, the bar-shaped spacers are arranged beneath display panel 20 or on emitter panel 10 and then fixed by using a sealant. The lateral portions of the bar-shaped spacers are inserted into the recesses of the fixing jigs and then fixed by using the sealant when the fixing jigs are provided.

If the bar-shaped spacers are fixed on emitter panel 10, display panel 20 is aligned above emitter panel 10 and both panels 10, 20 are combined according as the peripheral regions of both panels 10, 20 are sealed by using the sealant. If the bar-shaped spacers are fixed beneath display panel 20, emitter panel 20 is aligned under display panel 20 and both panels 10, 20 are combined. In this case, the peripheral regions are sealed except the portion where an exhaust hole is formed in order to vacuumize the space between display panel 20 and emitter panel 10. In the evacuating process, a minute glass pipe is connected to the exhaust hole for vacuumizing the space. The air in the space is extracted through the minute glass pipe by using a vacuum pump so that the space becomes a high vacuum state of about $10^{-7}$ torr. The flat panel display apparatus is completed when the minute glass pipe is tipped off.

Figure 8:
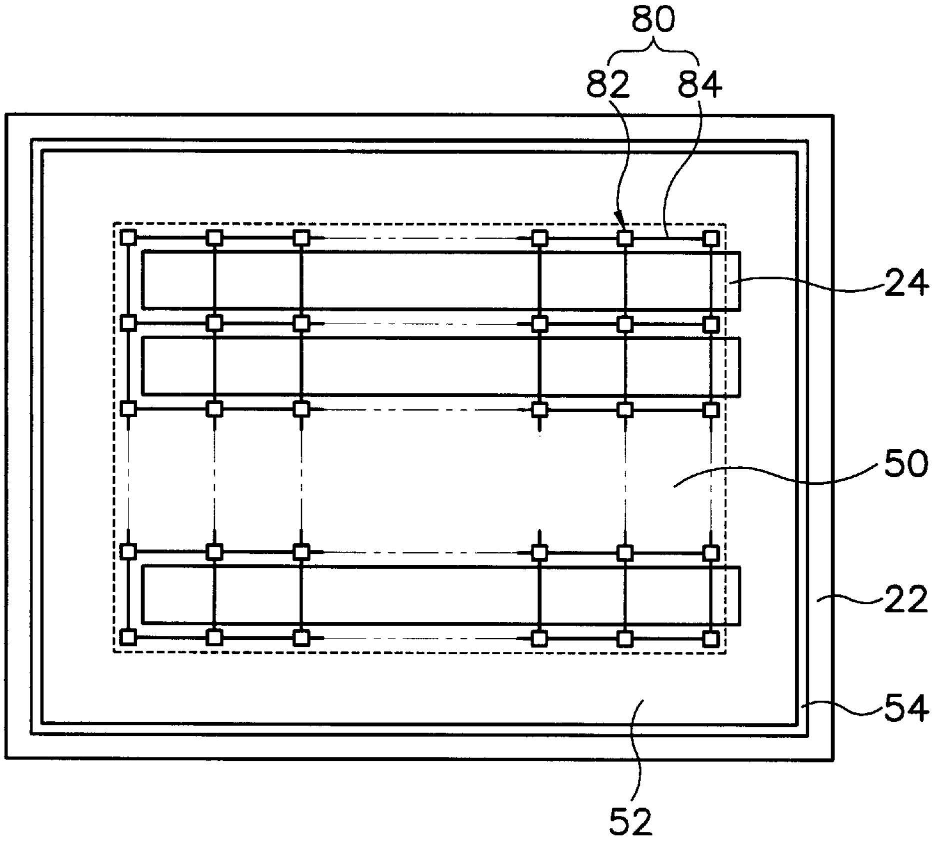
FIG. 8 is a plan view for illustrating a field emission display apparatus having a latticed spacer according to other embodiment of the present invention.
Figure 9:
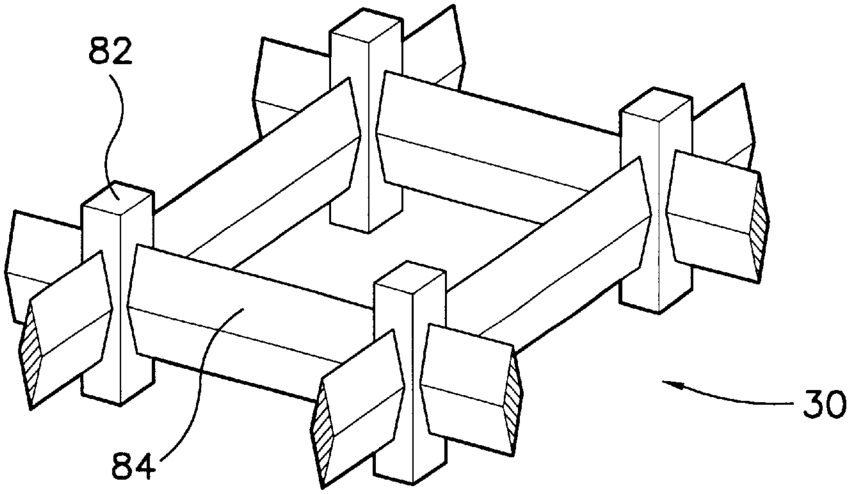
FIG. 9 is a partially magnified view in perspective of the latticed spacer in FIG. 8.

FIG. 8 is a plan view for illustrating a field emission display apparatus having a latticed spacer according to another embodiment of the present invention and FIG. 9 is a partially magnified view in perspective of the latticed spacer in FIG. 8. In FIGS. 8 and 9, the same elements have the same reference numerals and functions as the above-mentioned embodiments except the latticed spacer.

Referring FIGS. 8 and 9, a latticed spacer 80 has a lattice shape or a net shape and is arranged in display region 50. Lattice spacer 80 is composed of supporting posts 82 and connecting walls 84. Supporting posts 82 are formed at each cross point of a lattice and connecting walls 84 are formed between supporting posts 82. Supporting posts 82 maintain the space between display panel 20 and emitter panel, and connecting walls 84 fixably support supporting posts 82.

The heights of connecting walls 84 are lower than those of supporting posts 82 so that supporting posts 82 maintain display panel 20 and emitter panel 10 by a predetermined gap and connecting walls 84 do not contact with display panel 20 or emitter panel 10. The portions of the space between display panel 20 and emitter panel 10 are partially connected one after another because supporting posts 82 are higher than connecting walls 84. Therefore, the air in the space can be easily extracted through the connecting portions of the space during vacuumizing the space.

Figure 10:
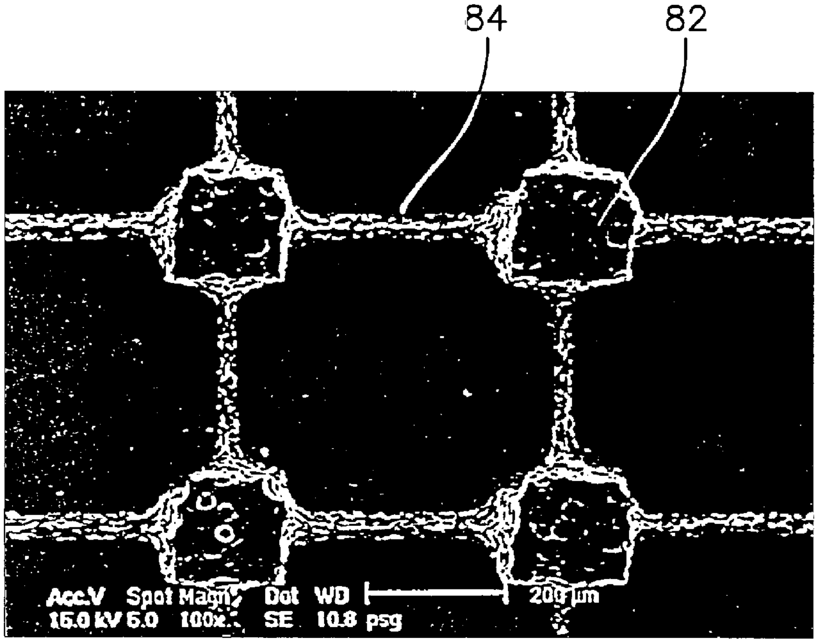
FIG. 10 is a partially magnified photograph in a plan view of the latticed spacer in FIG. 8.
Figure 11:
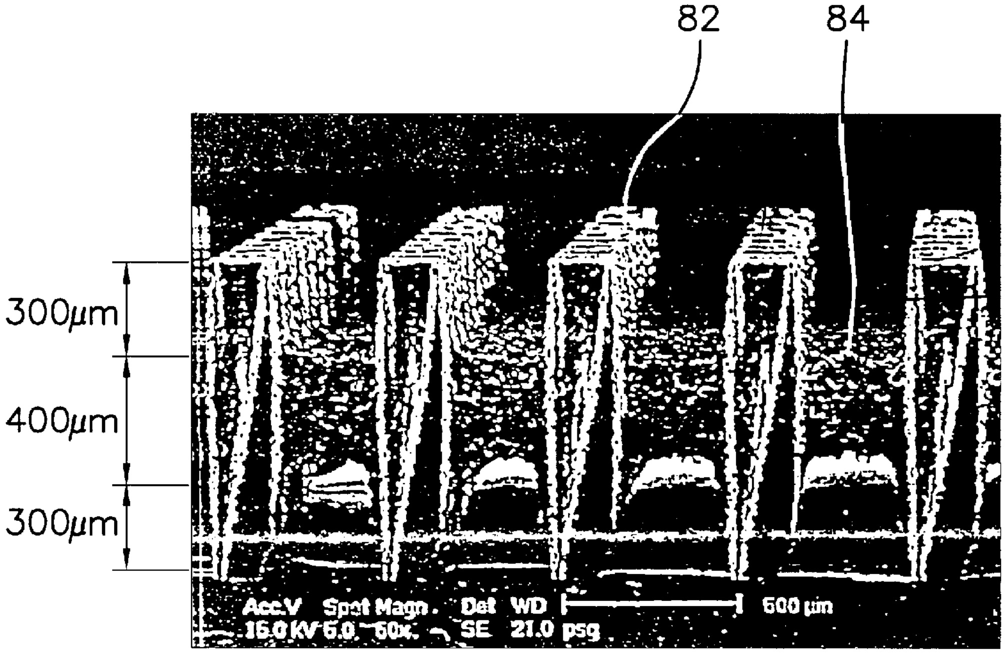
FIG. 11 is a partially magnified photograph in a side view of the latticed spacer in FIG. 8.

FIG. 10 is a partially magnified photograph in a plan view of the latticed spacer in FIG. 8 and FIG. 11 is a partially magnified photograph in a side view of the latticed spacer in FIG. 8.

Referring to FIGS. 10 and 11, the pitch and the width of latticed spacer 80 are about 600 μm and 60 μm, respectively. In FIGS. 10 and 11, latticed spacer 80 is obtained by a tilt exposure process having a tilt angle of about 11° in the left and right directions from the upper and bottom ends of a photosensitive material such as a photosensitive glass or photosensitive ceramic. Connecting walls 84 are located from the top and bottom ends of supporting posts 82 by a distance of about 300 μm. Connecting walls 84 have heights of about 400 μm.

The method for manufacturing the flat panel apparatus having the above spacers according to another embodiment of the present invention will be described as follows.

Figure 12:
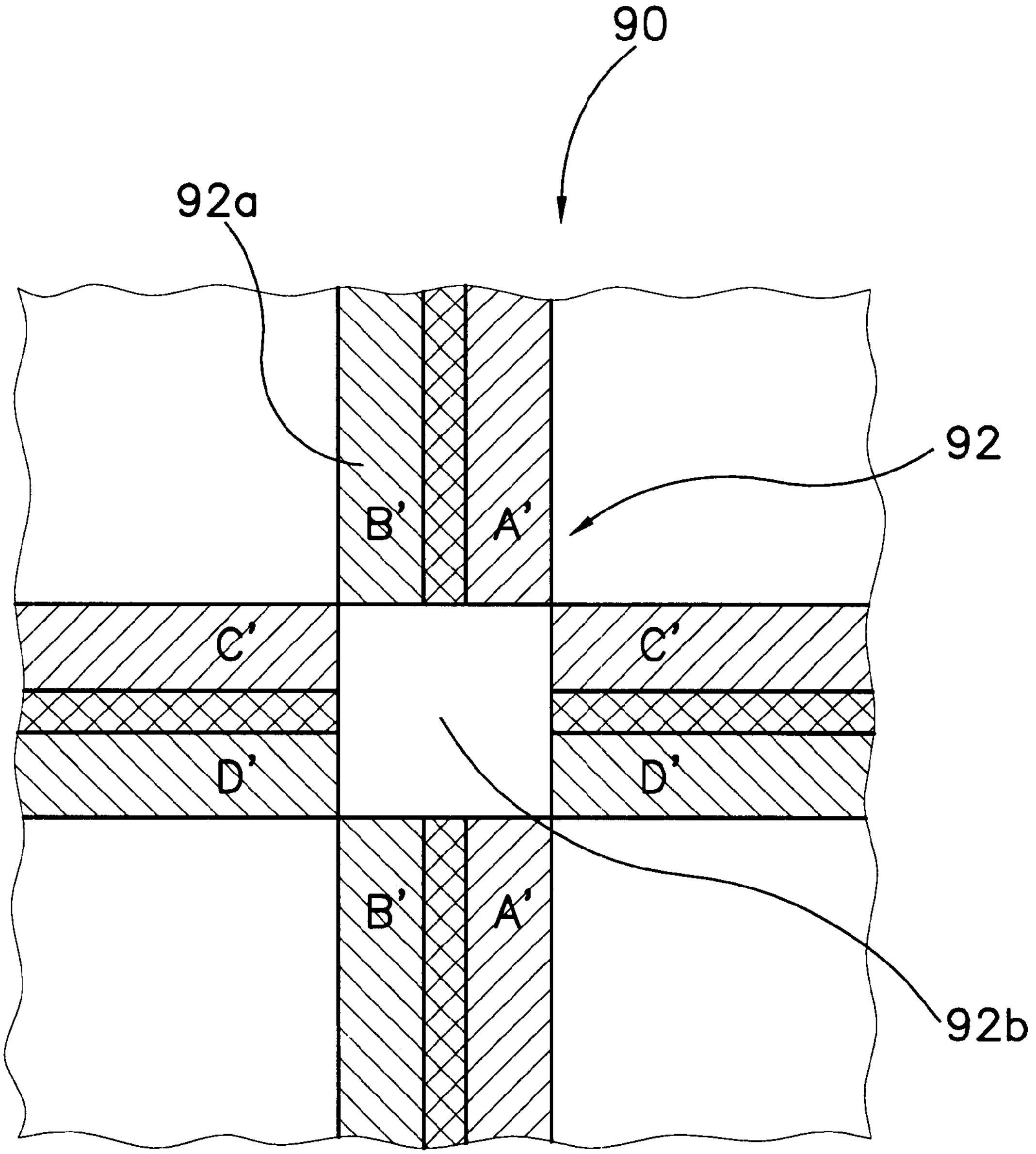
FIG. 12 is a plan view for illustrating a mask pattern and tilt exposing regions of a photosensitive material to form the latticed spacer in FIG. 8.
Figure 13:
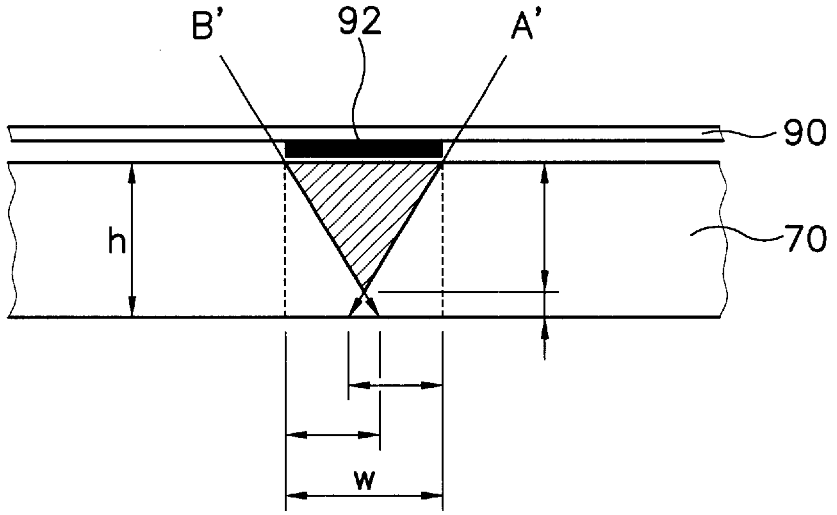
FIGS. 13 and 14 are cross-sectional views for illustrating a tilt exposure process of top and bottom ends of the photosensitive material to form the latticed spacer in FIG. 8.
Figure 14:
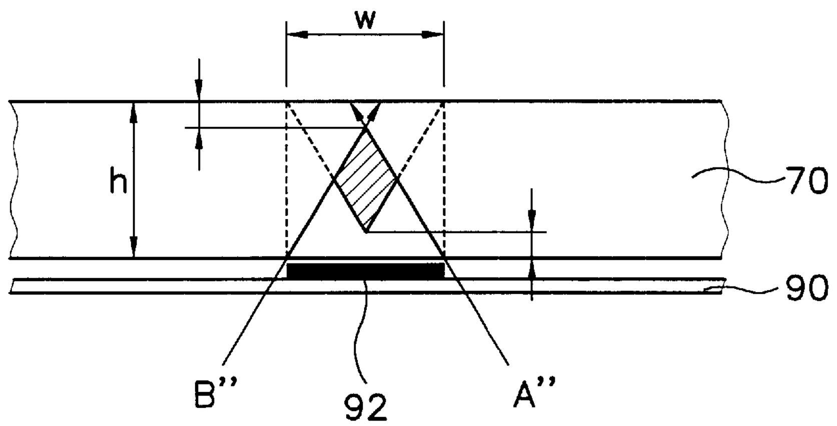

FIG. 12 is a plan view for illustrating a mask pattern and tilt exposing regions of a photosensitive glass to form the latticed spacer in FIG. 8 and FIGS. 13 and 14 are cross-sectional views for illustrating a tilt exposure process of top and bottom ends of the photosensitive glass to form the latticed spacer in FIG. 8.

Referring to FIG. 12, exposure mask 90 is manufactured after chrome is coated on a quartz substrate (not shown) and patterned as a metal pattern having a pitch of about 600 μm and a width of about 60 μm. Exposure mask 60 comprises a lattice pattern 92 having a pitch of about 600 μm and a width of about 60 μm according to the metal pattern. Then, photosensitive glass 70 is exposed by using exposure mask 90 and by a U.V. ray having a wavelength of about 312 nm from the top of photosensitive glass 70.

Referring to FIGS. 12 and 13, photosensitive glass 70 is exposed in the left direction (as shown the arrow A') and the right direction (as shown the arrow B') by the tilt exposure having a tile angle of about 11°. So, first and second exposed portions A' and B' are formed in photosensitive glass 70 as shown in FIG. 12 by slanting lines. First and second exposed portions A' and B' respectively have angles of about 45° and 135° from the bottom end of photosensitive glass 70. Referring to FIG. 13, the portions of photosensitive glass 70 are exposed by the U.V. rays in the left and right directions A' and B' in order to form first and second exposed portions A' and B' except a reverse triangular portion of photosensitive glass 70 under mask pattern 92 of exposure mask 90. That is, other portions of photosensitive glass are exposed except the reverse triangle-shaped portion.

With the same method, photosensitive glass 70 is exposed in the upward and downward directions by the tilt exposure method, so a third exposed portion C' and a forth exposed portion D' are formed in photosensitive glass 70 as shown in FIG. 12 by slanting lines. Hence, unexposed portions of photosensitive glass 70 are formed like swage shapes under a column and a row line 92*a* of mask pattern 92. However, a tetragonal-shaped unexposed portion of photosensitive glass 70 is formed under intersection 92*b* of mask pattern 92.

After the tilt exposure process is completed from the top of photosensitive glass 70, exposure mask 90 is placed under the bottom end of photosensitive glass 70 corresponding to the top exposure process. With reference to FIG. 14, photosensitive glass 70 is exposed from its bottom end according to the above-mentioned exposure process so that most portions of photosensitive glass 70 are exposed when the U. V. rays are irradiated in the left and right directions A" and B" by the bottom tilt exposure process except a triangular region contrasted to the reversed triangular. Hence, the triangular portion above pattern 92 of exposure mask 90 is unexposed and the unexposed portions together form an unexposed rhombic-shaped portion. That is, the reversed triangular portion is unexposed during the top exposure process and the triangular region is unexposed during the bottom exposure process, and then portions of the reversed triangular portion and the triangular portion are overlapped after the bottom exposed process thereby forming the unexposed rhombic-shaped portion. Therefore, the unexposed rhombic-shaped portion is formed under column and row lines 92*a* and an unexposed tetragonal-shaped portion is formed under intersection 92*b* of pattern 92.

To form the unexposed rhombic-shaped portion, the tilt angle θ of the bottom exposure process should meet the condition according to following equation (4):

$$\tan(w/2h)<\theta<\tan(w/h) \quad (4)$$

When the top and bottom tilt exposure processes are completed, photosensitive glass 70 is deposited in a furnace and heat-treated as the above-mentioned process. Then, the exposed portions of photosensitive glass 70 are etched by using a solution of about 10% hydrogen fluoride. After photosensitive glass 70 is rinsed and dried, latticed spacer 80 having supporting posts 82 and connecting walls 84 is completed as shown in FIG. 9. Supporting posts 82 have tetragonal shapes corresponding to intersection 92*b* of pattern 92 and connecting walls 84 have rohombic-shaped cross sections corresponding to row and column lines 92*a* of pattern 92.

After latticed spacer 80 is mounted on emitter panel 10 or beneath display panel 10, both panels 10 and 20 are combined according as the peripheral regions of both panels 10 and 20 are sealed by using the sealant. In this case, the peripheral regions of both panels 10 and 20 are sealed except the portion where an exhaust hole is formed in order to vacuumize the space between display panel 20 and emitter panel 10. In the evacuating process, a minute glass pipe is connected to the exhaust hole for vacuumizing the space. The air in the space is extracted through the minute glass pipe by using a vacuum pump so that the space becomes a high vacuum state of about $10^{-7}$ torr. The flat panel display apparatus is completed when the minute glass pipe is tipped off.

As it is described above, it is easy to fabricate the display apparatus having high aspect ratio spacers because the spacers having the supporting walls and the supporting legs are separately manufactured by using the photosensitive material and mounted on the emitter panel or beneath the display panel. Also, the vacuumizing of the space between the display panel and the emitter panel is easily achieved because the supporting walls and the supporting legs respectively have different heights or the supporting posts and the connecting walls respectively have different heights. Furthermore, since the spacers are formed separately from the display and emitter panels, the fabrication of the spacers and the panels are facilely completed without any damage of the fluorescent materials of the display panel.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. A flat panel display apparatus comprising:

an emitter panel having a lower substrate, cathode electrodes formed on the lower substrate and gate electrodes formed on the cathode electrodes;

a display panel having an upper substrate, transparent anode electrodes formed on the upper substrate and fluorescent materials coated on the anode electrodes;

a plurality of spacers for maintaining said emitter panel and said display panel by a predetermined gap, which comprises supporting walls having high aspect ratio (the ratio of the height over width) of above 10 and supporting legs respectively protruded from the supporting walls in order to support the supporting walls; and a sealing means for vacuum sealing peripheral regions of said emitter panel and said display panel.

2. The flat panel display apparatus as claimed in claim 1, wherein said spacers are formed by exposing and etching a photosensitive material.

3. The flat panel display apparatus as claimed in claim 2, wherein cross sections of the supporting walls have rectangular shapes, hexagonal shapes or trapezoid shapes and cross sections of the supporting legs have triangular shapes by a tilt exposure method or rectangular shapes by a vertical exposure method.

4. The flat panel display apparatus as claimed in claim 3, wherein upper ends of the supporting walls are attached to said display panel when the cross sections of the supporting walls have the trapezoid shapes.

5. The flat panel display apparatus as claimed in claim 1, wherein lengths of the supporting walls are longer than a display region of said display panel and the supporting legs are formed at both lateral portions of the supporting walls which lie at the peripheral region of said display panel so that said spacers have bar shapes which are longer than the display region of said display panel.

6. The flat panel display apparatus as claimed in claim 1, wherein lengths of the supporting walls are shorter than a display region of said display panel and the supporting legs are formed at lateral portions of the supporting walls which lie at the peripheral region of said display panel so that said spacers have half bar shapes which are shorter than the display region of said display panel.

7. The flat panel display apparatus as claimed in claim 1, wherein lengths of the supporting walls are shorter than a display region of said display panel and a plurality of supporting legs are formed at lateral portions of the supporting walls by predetermined intervals so that said spacers have rib shapes.

8. The flat panel display apparatus as claimed in claim 1, further comprising a plurality of fixing jigs having recesses for receiving lateral portions of the supporting walls where the supporting legs are formed in order to fix said spacers, wherein the jigs are formed at the peripheral region of said display panel.

9. The flat panel display apparatus as claimed in claim 1, wherein heights of the supporting legs are lower than heights of the supporting walls.

10. A method for manufacturing a flat panel display apparatus comprising the steps of:

providing an emitter panel having a lower substrate, cathode electrodes formed on the lower substrate and gate electrodes formed on the cathode electrodes;

providing a display panel having an upper substrate, transparent anode electrodes formed on the upper substrate and fluorescent materials coated on the anode electrodes;

exposing and etching a photosensitive material to form a plurality of spacers comprising supporting walls having high aspect ratio (the ratio of the height over width) of above 10 and supporting legs respectively protruded from the supporting walls in order to support the supporting walls;

arranging the spacers between said emitter panel and said display panel by predetermined intervals for maintaining said emitter panel and said display panel by a predetermined gap; and sealing peripheral regions of said emitter panel and said display panel and evacuating a space between said emitter panel and said display panel.

11. The method for manufacturing the flat panel display apparatus as claimed in claim 10, wherein the step of exposing and etching the photosensitive material to form a plurality of spacers further comprises the substeps of:

providing the photosensitive material having a predetermined thickness;

placing an exposing mask above the photosensitive material, wherein the exposing mask comprising a pattern including a supporting line having a predetermined length and subsidiary lines protruded from the supporting line, the subsidiary lines being shorter than the supporting line;

exposing the photosensitive material by using the exposing mask;

heat-treating the exposed photosensitive material; and etching an exposed portion of the photosensitive material to form the supporting walls formed according to the supporting line and the supporting legs formed according to the subsidiary lines, wherein the supporting walls and the supporting legs are simultaneously formed.

12. The method for manufacturing the flat panel display apparatus as claimed in claim 11, wherein the substep of exposing the photosensitive material is performed by a tilt exposure method according to the following equation:

$$\theta<\tan(w/2h)$$

wherein θ, w and h respectively represent a tilt angle of the tilt exposure method, widths of the subsidiary lines and a thickness of the photosensitive material.

13. The method for manufacturing the flat panel display apparatus as claimed in claim 11, wherein the substep of exposing the photosensitive material is performed by a tilt exposure method according to the following equation:

$$\theta>\tan(w/2h)$$

wherein θ, w and h respectively represent a tilt angle of the tilt exposure method, widths of the subsidiary lines and a thickness of the photosensitive material.

14. The method for manufacturing the flat panel display apparatus as claimed in claim 11, wherein the substep of exposing the photosensitive material is performed by a tilt exposure method according the following equations:

$$\theta_1<\tan(w/2h);$$

and $$\theta_2>\tan(w/2h)$$

wherein $\theta_1$ represents left and right tilt angles of the supporting line, w means widths of the subsidiary lines, h represents a thickness of the photosensitive material and $\theta_2$ represents left and right tilt angles of the subsidiary lines.

15. The method for manufacturing the flat panel display apparatus as claimed in claim 14, wherein the substeps of exposing the photosensitive material further comprises:

placing the exposing mask under the photosensitive material corresponding to the step of placing the exposing mask above the photosensitive material; and exposing the photosensitive material by using the exposing mask and by a tilt exposure method according to the following equation:

$$\theta_1<\tan(w/2h)$$

wherein $\theta_1$, w and h respectively represent the left and right tilt angles of the supporting line, the width of the subsidiary lines and the thickness of the photosensitive material.

16. The method for manufacturing the flat panel display apparatus as claimed in claim 10, wherein the photosensitive material comprises silicon oxide ($SiO_2$), lithium oxide ($Li_2O$), aluminum oxide ($Al_2O_3$), sodium oxide ($Na_2O$), silver oxide ($Ag_2O$) and cerium oxide ($CeO_2$).

17. The method for manufacturing the flat panel display apparatus as claimed in claim 10, wherein the photosensitive material has a thickness of between about 0.2 mm and about 2.0 mm.

18. The method for manufacturing the flat panel display apparatus as claimed in claim 10, wherein the step of providing said display panel further comprises:

forming a plurality of fixing jigs having recesses at the peripheral region of said display panel; and forming at least one alignment mark for aligning said display panel and said emitter panel at the peripheral region of said display panel, wherein the fixing jigs and the alignment mark are simultaneously formed and said spacers are fixed by inserting lateral portions of said spacers into the recesses of the jigs.

* * * * *